(12) United States Patent
Worley et al.

(10) Patent No.: US 10,200,309 B2
(45) Date of Patent: Feb. 5, 2019

(54) TWO-HEADED SWITCH INCLUDING A DRIVE BAY FOR FABRIC-ATTACHED DEVICES

(71) Applicant: Samsung Electronics Co., Ltd., Suwon-si, Gyeonngi-do (KR)

(72) Inventors: Fred Worley, San Jose, CA (US); Sompong Paul Olarig, Pleasanton, CA (US)

(73) Assignee: Samsung Electronics Co., Ltd. (KR)

( * ) Notice: Subject to any disclaimer, the term of this patent is extended or adjusted under 35 U.S.C. 154(b) by 112 days.

(21) Appl. No.: 15/280,842

(22) Filed: Sep. 29, 2016

(65) Prior Publication Data

US 2018/0048592 A1    Feb. 15, 2018

Related U.S. Application Data

(60) Provisional application No. 62/374,673, filed on Aug. 12, 2016.

(51) Int. Cl.
*H04L 12/935* (2013.01)
*H04L 12/931* (2013.01)

(52) U.S. Cl.
CPC .......... *H04L 49/30* (2013.01); *H04L 49/351* (2013.01); *H04L 49/356* (2013.01)

(58) Field of Classification Search
CPC ...... H04L 49/30; H04L 49/351; H04L 49/356
See application file for complete search history.

(56) References Cited

U.S. PATENT DOCUMENTS

| | | | |
|---|---|---|---|
| 5,933,427 A | 8/1999 | Liang | |
| 7,308,705 B2 | 12/2007 | Gordy et al. | |
| 7,493,311 B1 | 2/2009 | Cutsinger et al. | |
| 7,620,048 B2 | 11/2009 | Bass et al. | |
| 8,116,309 B2 | 2/2012 | Sharma | |
| 9,009,959 B2 | 4/2015 | Schuette | |
| 9,037,772 B2* | 5/2015 | Myrah | G06F 3/0605 710/316 |
| 2014/0049897 A1 | 2/2014 | Hoss et al. | |
| 2015/0009616 A1* | 1/2015 | Adrian | H05K 7/1494 361/679.32 |
| 2017/0220505 A1* | 8/2017 | Breakstone | G06F 13/364 |

* cited by examiner

*Primary Examiner* — Mansour Oveissi
(74) *Attorney, Agent, or Firm* — Innovation Counsel LLP

(57) ABSTRACT

A switch includes a chassis, a drive bay including a plurality of downlink switch ports that are configured to be connected to a plurality of storage devices, a plurality of uplink switch ports, and an embedded circuit for providing signal switching between the plurality of uplink switch ports and the plurality of downlink switch ports. The drive bay is disposed on a first side of the chassis, and the plurality of uplink switch ports are disposed on a second side of the chassis that is opposite to the first side of the chassis. The plurality of downlink switch ports is embedded in the drive bay.

20 Claims, 4 Drawing Sheets

TWO-HEADED SWITCH INCLUDING A DRIVE BAY FOR FABRIC-ATTACHED DEVICES

CROSS-REFERENCE TO RELATED APPLICATION(S)

This application claims the benefits of and priority to U.S. Provisional Patent Application Ser. No. 62/374,673 filed Aug. 12, 2016, the disclosure of which is incorporated herein by reference in its entirety.

TECHNICAL FIELD

The present disclosure relates generally to network switches, more particularly, to a two-headed switch including a drive bay for fabric-attached devices.

BACKGROUND

A standard Ethernet switch has user-accessible uplink ports such as RJ45, small form-factor pluggable (SFP), and quad small form-factor pluggable (QSFP). Active networking ports are typically located on one side of the switch. In addition to the networking ports, some switches may provide one or more management ports on another side of the chassis due to the limited space on the single-headed side. However, those switches do not provide data and/or networking ports on two or more sides of the chassis.

Non-volatile memory (NVM) express (NVMe) is a standard that defines a register-level interface for host software to communicate with a non-volatile memory subsystem (e.g., a solid-state drive (SSD)) over a peripheral component interconnect express (PCIe) bus. NVMe over fabrics (NVMf) is an extension to the NVMe standard enabling operation over a variety of fabrics (or interconnects) other than PCIe. Herein, the term, fabric, represents a network topology in which network nodes can pass data to each other through a variety of interconnecting protocols, ports, and switches. For example, Ethernet-attached SSDs may attach directly to a fabric, and in this case the fabric is the Ethernet.

FIG. 1A shows a system block diagram of an example NVMe-based storage system. The single-headed switch 150A includes a motherboard 151 (e.g., x86-based motherboard), a plurality of network interface cards 152A-152L, and a plurality of downlink switch ports (e.g., via PCIe) 153A-153M for providing device interfaces to a plurality of front-access drives using cables and connectors arranged in a midplane/backplane 160A. The front-access drives may be solid-state drives (SSDs) 170A-170N. The downlink switch ports 153A-153M can support PCIe interfaces. The single-headed switch 150A has a plurality of uplink ports 110 to receive requests from a plurality of initiators (e.g., servers and clients) to the targeted SSDs 170A-170N. The plurality of uplink ports 110 can be used to provide the requested data or a status (e.g., write completion) from the SSDs 170A-170N. The single-headed switch 150A can be used in an NVMe-based server or storage system.

FIG. 1B shows a system block diagram of an example NVMf-based storage system. The single-headed switch 150B includes an Ethernet switch 155 in 1 RU and a drive bay in 2 RU. The drive bay includes a pass-through board 157, and a midplane/backplane 160B. The pass-through board 157 includes a plurality of quad small form-factor pluggable (QSFP) connectors to connect to targeted SSDs 170A-170N. The single-headed switch 150B has a plurality of uplink ports 110 to receive requests from a plurality of initiators (e.g., servers and clients) to the targeted SSDs 170A-170N. The plurality of uplink ports 110 can be used to provide the requested data or a status (e.g., write completion) from the SSDs 170A-170N. The single-headed switch 150B can be used in an NVMf-based server or storage system.

To provide connectivity for devices or servers compatible with NVMe over fabric to SSD drives, a standard switch may be used. However, the standard switch would need a rack space and a deeper chassis to accommodate bulky internal connectors and cables for the uplink and downlink ports. These internal connectors and cables may prohibit fully exploiting the high-speed connectivity that NVMe over fabric devices may offer. Further, the use of the standard external switches to support NVMe over fabric would be costly due to the requirement for an additional power supply for the drive bay chassis in addition to a power supply for the external switch.

SUMMARY

According to one embodiment, a switch includes a chassis, a drive bay including a plurality of downlink switch ports that are configured to be connected to a plurality of storage devices, a plurality of uplink switch ports, and an embedded circuit for providing signal switching between the plurality of uplink switch ports and the plurality of downlink switch ports. The drive bay is disposed on a first side of the chassis, and the plurality of uplink switch ports are disposed on a second side of the chassis that is opposite to the first side of the chassis. The plurality of downlink switch ports is embedded in the drive bay.

According to another embodiment, a switch includes a chassis, a drive bay comprising a plurality of downlink switch ports configured to be connected to a plurality of non-storage devices, wherein the drive bay is disposed on a first side of the chassis, a plurality of uplink switch ports disposed on a second side of the chassis that is opposite to the first side of the chassis, and an embedded circuit for providing signal switching between the plurality of uplink switch ports and the plurality of downlink switch ports. The plurality of downlink switch ports is embedded in the drive bay.

According to yet another embodiment, a switch includes a chassis, a drive bay comprising a plurality of downlink switch ports configured to be connected to a plurality of devices including at least one storage device and at least one non-storage device, wherein the drive bay is disposed on a first side of the chassis, a plurality of uplink switch ports disposed on a second side of the chassis that is opposite to the first side of the chassis, and an embedded circuit for providing signal switching between the plurality of uplink switch ports and the plurality of downlink switch ports. The plurality of downlink switch ports is embedded in the drive bay.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

Figure 1A:
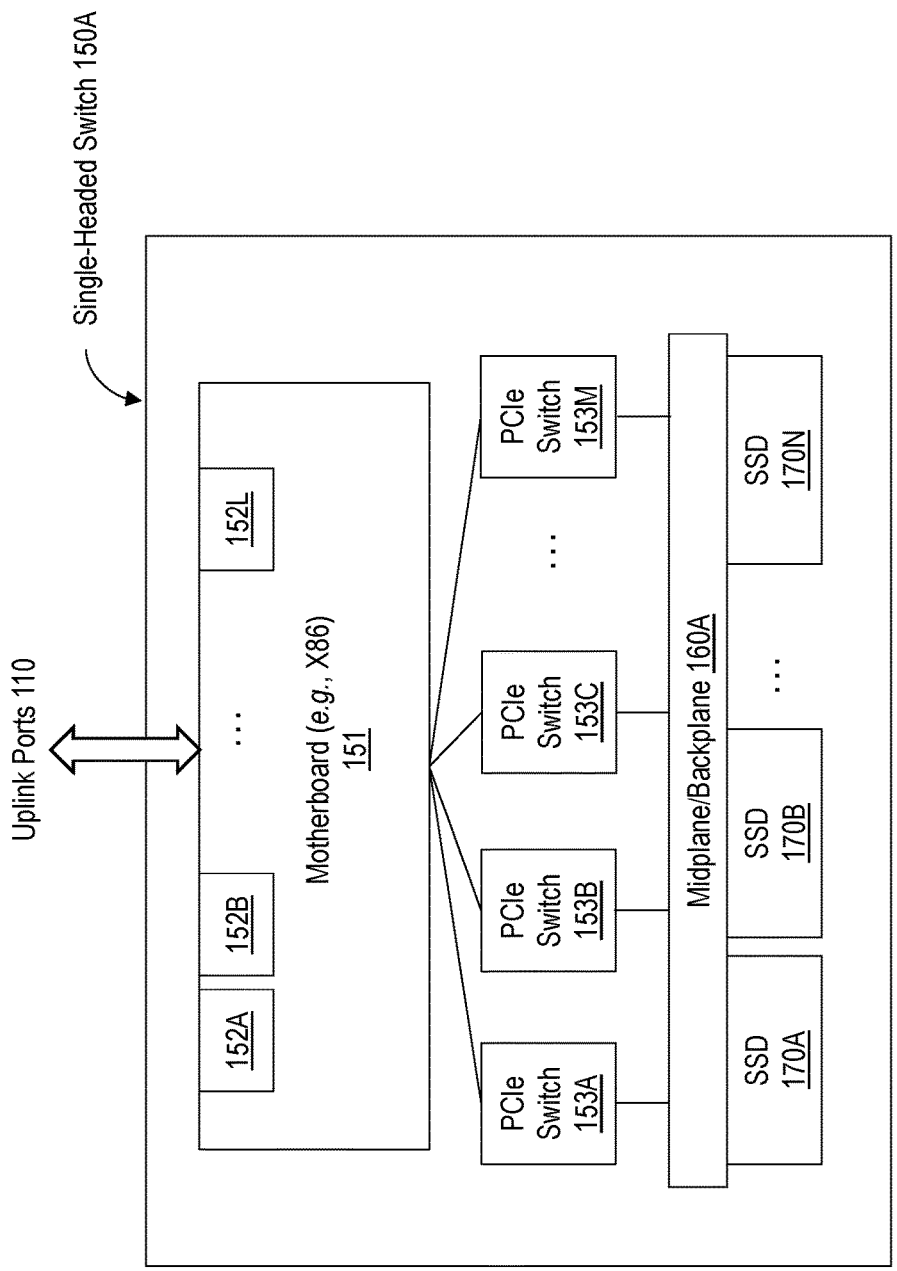
FIG. 1A shows a system block diagram of an example NVMe-based storage system.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Each of the features and teachings disclosed herein can be utilized separately or in conjunction with other features and teachings to provide a two-headed switch including a drive bay for network-attached storage devices. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms presented herein are not inherently related to any particular computer or other apparatus. Various general-purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The present disclosure provides a two-headed switch including a drive bay for providing interfaces to a number of storage devices such as fabric-attached SSDs. According to one embodiment, a front-access storage device can be inserted to the drive bay. According to another embodiment, a non-storage device such as a micro-server and a port expander can be inserted into the drive bay. The non-storage device may be Ethernet-compatible and have a form factor appropriate for being inserted into the drive bay of the two-headed switch. The drive bay may have appropriate types of connectors that match the connectors of one or more of the storage devices and the non-storage devices. The two-headed switch can have a small form factor and small footprint chassis compared to the single-headed switch 150 of FIG. 1 by eliminating some internal connectors, X86 CPUs, large amount of DRAM memory and all PCIe switches. In addition, the two-headed switch can avoid the use of Ethernet repeaters and/or retimers that may be necessary for the single-headed switch 150 to feed the Ethernet signals from the external devices (e.g., NVMe over fabric (NVMf) devices) to the attached storage devices (e.g., SSDs and eSSDs) or the attached non-storage devices (e.g., micro-servers and port expanders).

According to one embodiment, the two-headed switch includes downlink switch ports and uplink switch ports on opposite sides of the chassis. The downlink switch ports can be hard-traced and/or embedded in the drive bay on one side of the chassis to connect the storage devices using high-speed connectors such as Molex impact connectors. The uplink switch ports are located on the opposite side of the switch from the downlink switch ports. The physical size of the two-headed switch can be reduced by embedding the downlink switch ports in the drive bay and eliminating internal connectors (e.g., QSFP) and cables that would be required for a single-headed switch. Further, the reduced physical size by eliminating interconnect cables and X86 CPUs, a chipset, and a memory make the two-headed switch more thermally and power efficient, making it adequate for providing high-speed and high-performance switching between the uplink ports and the downlink ports.

Figure 2:
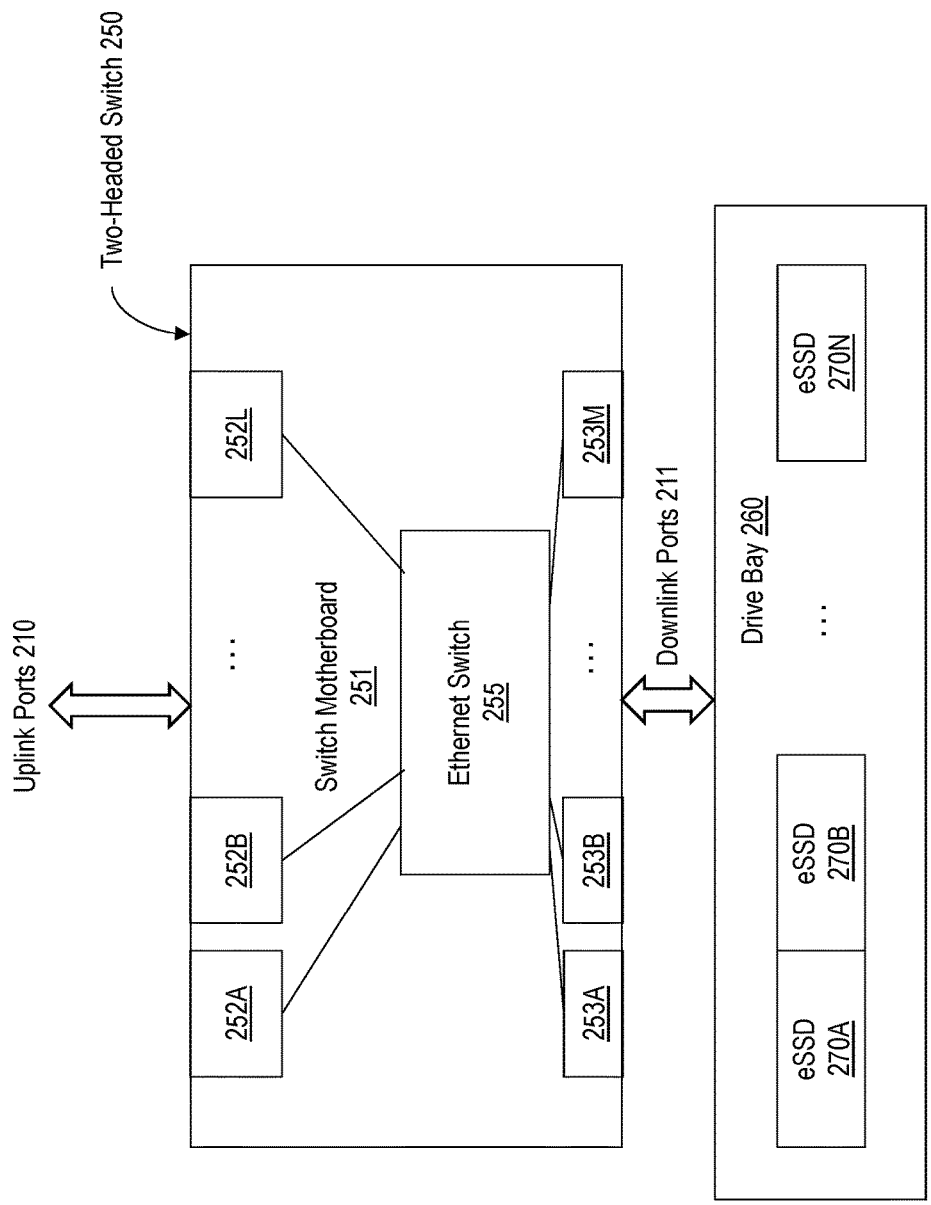
FIG. 2 shows a system block diagram of an example two-headed switch, according to one embodiment.

FIG. 2 shows a system block diagram of an example two-headed switch, according to one embodiment. The two-headed switch 250 can include an application-specific integrated circuit (ASIC), an embedded CPU, an FPGA, a baseboard management controller (BMC), a plurality of uplink switch (e.g., QSFP or SFP) ports 252A-252L to provide uplink ports 210, and a drive bay 260 including a plurality of high-speed backplane and/or midplane connectors to provide downlink ports 211. The embedded CPU and the Ethernet switch 255 can process direct switching/translation from the uplink protocol and pinout to the downlink protocol and pinout. In one embodiment, the uplink protocol is Ethernet, and the downlink connector is U.2. The BMC can monitor the physical state of the two-headed switch 250 and the fabric eSSDs using one or more embedded sensors and communicate with a system administrator, for example, through an independent management LAN port (not shown) in addition to the uplink ports 210.

The drive bay 260 can provide embedded downlink switch ports to connect a plurality of front-access drives such as the fabric eSSDs 270A-270N. It is noted that the fabric eSSDs 270A-270N may not be the storage drives that are compatible with conventional underlying storage protocols serial attached SCSI (SAS), serial AT attachment (SATA), and peripheral component interconnect (PCI). For example, the drive bay 260 has a plurality of front-access physical slots for accepting the fabric eSSDs 270A-270N. When being inserted into the front-access slots of the two-headed switch 250, the fabric eSSDs 270A-270N are connected to the high-speed connectors 253A-253M. In one embodiment, the downlink switch ports support peripheral component interconnect express (PCIe) interfaces. The two-headed switch 250 has a plurality of uplink ports 110 to process access requests received from a plurality of initiators (servers or clients) to the target SSDs 270A-270N. According to one embodiment, the two-headed switch 250 can be used in an NVMe-based server or storage system.

According to one embodiment, the fabric eSSDs 270A-270N are Ethernet-attached SSDs (e-SSDs), and the uplink switch ports are connected to the Ethernet. For example, the drive bay 260 has a total of 24 slots, each slot can support two (2) 10 Gb Ethernet ports. Therefore, a total of twenty-four (24) fabric eSSDs can be inserted into the drive bay 260. Each of the fabric eSSDs 270A-270N can include two (2) NVM targets. In this case, a total of forty-eight (48) NVM targets can be attached to the two-headed switch 250.

According to another embodiment, the uplink switch ports are SFP ports, and the downlink switch ports are U.2 ports. For example, each of the eSSDs can include two (2) NVM targets, and each of the NVM targets can be a 2.5 inch SFF drive or a U.2 SSD including two (2) 10 gigabyte Ethernet (GbE) SSD targets. However, it is understood that the number and type of the uplink and downlink switch ports are not limited to these examples, and any number of type of uplink and downlink switch ports may be used for the two-headed switch 250 without deviating from the scope of the present disclosure.

Figure 1B:
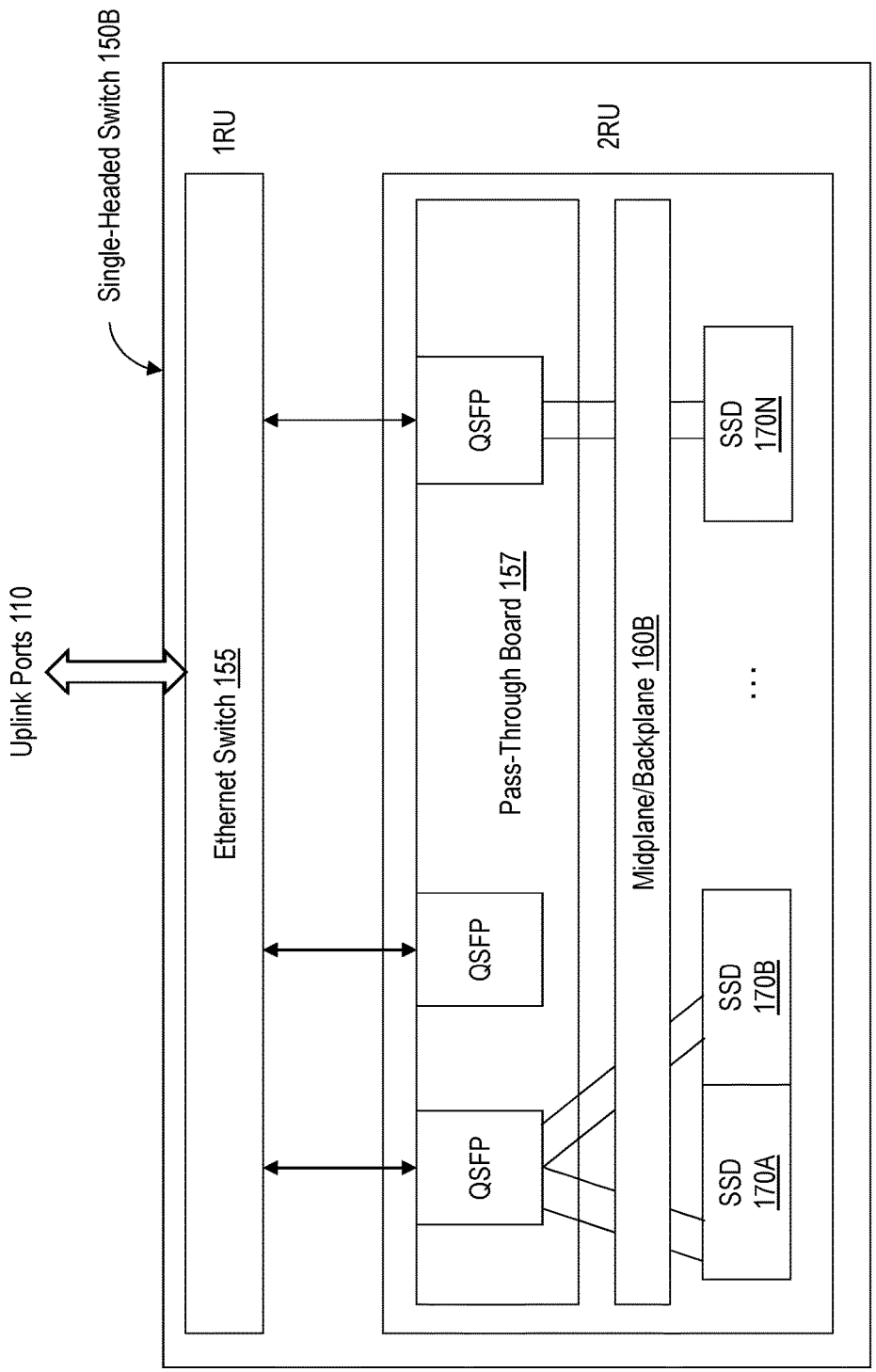
FIG. 1B shows a system block diagram of an example NVMf-based storage system.

The two-headed switch 250 has several advantages over a single-headed switch shown in FIG. 1. The downlink switch ports can be hard-traced or embedded in the drive bay 260 of the two-headed switch 250. The embedded downlink switch ports eliminate the needs for connectors and cables between a motherboard (e.g., the motherboard 151 of FIG. 1) and downlink switch ports. In addition, the physical proximity of the downlink switch ports to the drive bay 260 can improve the signal integrity and avoid using Ethernet repeaters or re-timers within the switch. The elimination of internal downlink switch QSFP/SFP ports and cables would lower the cost of the two-headed switch 250. Further, the two-headed switch 250 can have a shared power supply and a shared cooling fan for the drive bay chassis and external switch. The reduced number of power supplies and cooling fans can even further lower the cost of the two-headed switch 250 and the power consumption.

The two-headed switch 250 can eliminate Ethernet re-timers and/or repeaters that would be required for a single-headed switch to improve the signal integrity on the switch board due to the signal loss caused by the excessive length of the internal cables and connectors. The present two-headed switch 250 can have a smaller footprint in the rack (2 U) including an internal switch instead of having a size of 3 U with an external switch.

The uplink switch ports 252A-252L can be located on the opposite side of the switch chassis from the connectors 253A-253N of the downlink ports. The embedded downlink switch ports in the drive bay 260 can be disposed to be physically close to the SSDs 270A-270N by the elimination of internal cables and connectors and embedding the downlink ports in the drive bay. The uplink switch ports 252A-252L can be located on the other side of the chassis for ease of access to the uplink connectors.

According to one embodiment, the embedded downlink switch ports of the two-headed switch 250 can provide direct switching/translation from a network protocol and pinout (e.g., Ethernet) to a storage device-specific protocol and pinout (e.g., U.2) using the onboard CPU, the ASIC, and/or the FPGA. In this regards, the two-headed switch 250 is a mixed Ethernet/storage switch, where the storage interface outputs to the SSDs are on one side of the switch, and the networking ports are on the other side of the switch. This would simplify the construction of server rack units that can simultaneously have network switches and storage bays. The simple structure and two-headed design of the switch 250 can greatly improve the spatial efficiency for various storage-intensive applications, such as a datacenter.

As discussed above, the present two-headed switch 250 has two heads including a downlink head and an uplink head on opposite sides of the chassis. The downlink head is embedded in the switch prohibiting user-access (except through the bays), whereas the uplink head is exposed to allow user access for connecting and disconnecting the network cables. According to one embodiment, the drive bay of the two-headed switch 250 can accept front-accessible, hot-pluggable eSSDs. The downlinks between the switch board of the two-headed switch 250 and the eSSDs are arranged to be physically close to each other, therefore signal integrity therebetween can be improved without using Ethernet repeaters or retimers. The elimination of repeaters and retimers can reduce the material cost and improve signal latency and power consumption. In the case of eSSDs, the downlink ports of the two-headed switch 250 are end ports terminating all Ethernet traffics by the attached target SSDs.

The two-headed switch 250 can also eliminate standard transceivers for the downlink ports to the eSSDs. As a result, high-speed Ethernet signals can be electrically routed to the switch controller (e.g., ASIC) directly from the eSSDs via the high-speed connectors 253A-253M. The two-headed switch 250 can effectively achieve cost reduction by eliminating transceivers for the downlink ports (e.g., QSFT, SFP ports) and standard uplink ports (e.g., QSFT, SFP ports) on the switch board.

Figure 3:
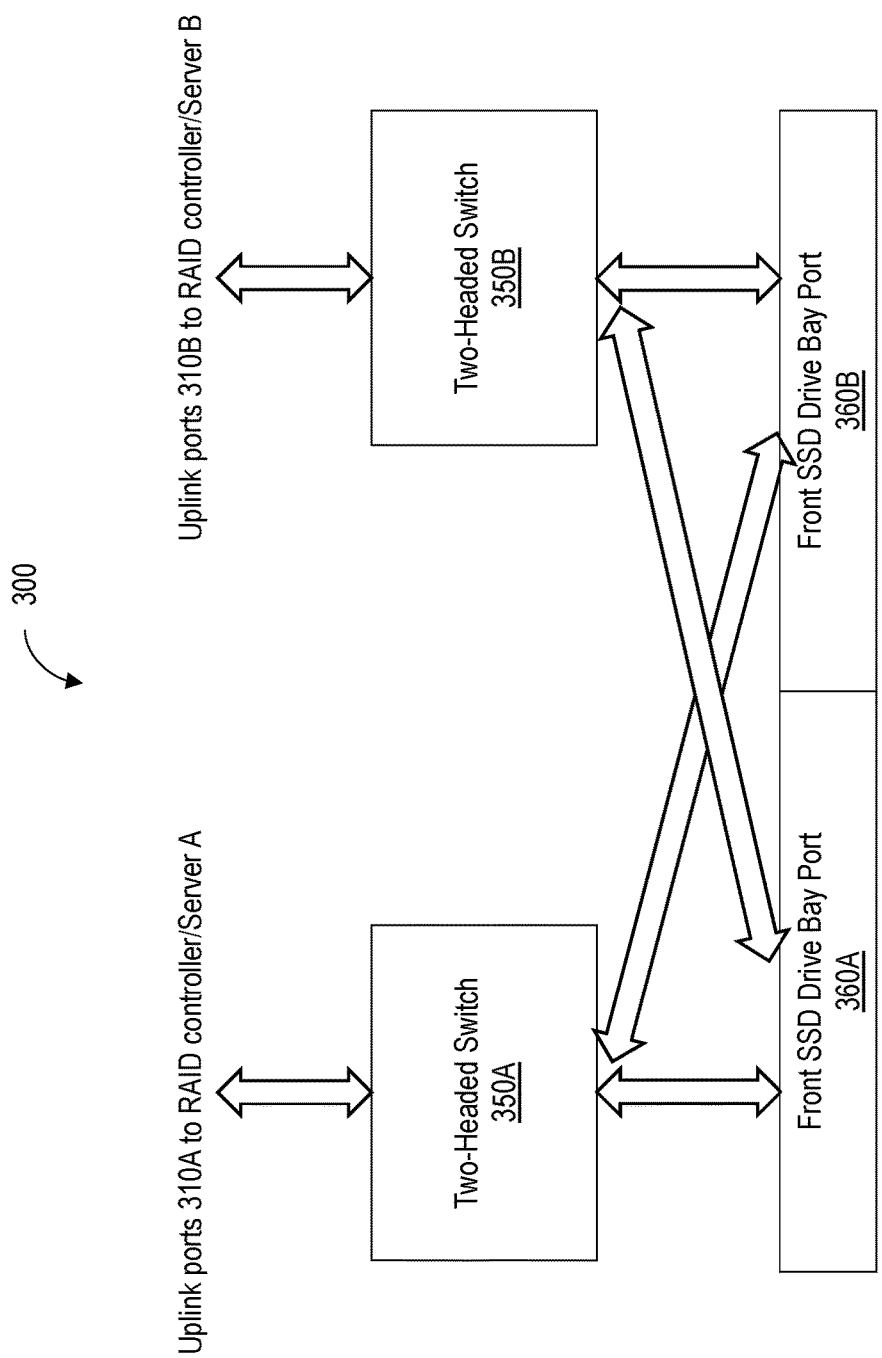
FIG. 3 shows a system block diagram for supporting dual port Ethernet-attached NVMe over fabrics, according to one embodiment.

FIG. 3 shows a system block diagram for supporting dual port Ethernet-attached NVMe over fabrics, according to one embodiment. The system 300 includes two two-headed switches 350A and 350B. Each of the two-headed switches 350A and 350B can directly connect to each of the front SSD drive bay ports 360A and 360B. In the case of eSSDs, the two-headed switches 350A and 350B can connect to the front SSD drive bay ports 360A and 360B over Ethernet.

Each of the two-headed switches 350A and 350B can provide uplink ports 310A and 310B to a different RAID controller (or a server). For example, the two-headed switch 350A can provide a first uplink port 310A to a first RAID controller (or server A), and the two-headed switch 350B can provide a second uplink port 310B to a second RAID controller (or server B). On the opposite side of the uplink ports, each of the two-headed switches 350A and 350B can provide downlink ports to the respective front SSD drive bay ports 360A and 360B. Each of the front SSD drive bay ports 360A and 360B can accommodate a plurality of SSDs, for example, two SSDs.

According to one embodiment, a switch includes a chassis, a drive bay including a plurality of downlink switch ports that are configured to be connected to a plurality of storage devices, a plurality of uplink switch ports, and an embedded circuit for providing signal switching between the plurality of uplink switch ports and the plurality of downlink switch ports. The drive bay is disposed on a first side of the chassis, and the plurality of uplink switch ports are disposed on a second side of the chassis that is opposite to the first side of the chassis. The plurality of downlink switch ports is embedded in the drive bay.

The plurality of downlink switch ports may be embedded in the drive bay to connect the plurality of storage devices, eliminating internal connectors.

The plurality of uplink switch ports may be small form-factor pluggable (SFP) ports.

The plurality of downlink switch ports may be U.2 ports.

Each of the plurality of storage devices may be a 2.5" small form factor (SFF) drive.

The plurality of storage devices may be front-access drives pluggable to the drive bay.

The plurality of storage devices may be solid-state drives (SSDs).

The SSDs may be Ethernet-attached SSDs (eSSDs).

The eSSDs may be connected to the switch over Ethernet.

Each of the plurality of storage devices may contain one or more non-volatile memory (NVM) targets.

The plurality of uplink switch ports may be connected to a plurality of initiators over Ethernet.

The switch may further include a power supply and a cooling fan.

The plurality of uplink switch ports may be connected to a plurality of external devices compatible with non-volatile memory (NVM) express (NVMe).

The plurality of uplink switch ports may be connected to a plurality of external devices compatible with NVMe over fabrics.

An NVMf-compatible device may be inserted into the drive bay.

The NVMf-compatible device may be a micro-server or a port expander.

According to another embodiment, a switch includes a chassis, a drive bay comprising a plurality of downlink switch ports configured to be connected to a plurality of non-storage devices, wherein the drive bay is disposed on a first side of the chassis, a plurality of uplink switch ports disposed on a second side of the chassis that is opposite to the first side of the chassis, and an embedded circuit for providing signal switching between the plurality of uplink switch ports and the plurality of downlink switch ports. The plurality of downlink switch ports is embedded in the drive bay.

The plurality of non-storage devices may include one or more of: a micro-server and a port expander that are Ethernet-compatible.

According to yet another embodiment, a switch includes a chassis, a drive bay comprising a plurality of downlink switch ports configured to be connected to a plurality of devices including at least one storage device and at least one non-storage device, wherein the drive bay is disposed on a first side of the chassis, a plurality of uplink switch ports disposed on a second side of the chassis that is opposite to the first side of the chassis, and an embedded circuit for providing signal switching between the plurality of uplink switch ports and the plurality of downlink switch ports. The plurality of downlink switch ports is embedded in the drive bay.

The at least one storage device may be an Ethernet-attached SSD and the at least one non-storage device may be an Ethernet-compatible micro-server or an Ethernet-compatible port expander.

The above example embodiments have been described hereinabove to illustrate various embodiments of implementing a system and method for providing a two-headed switch including a drive bay for network-attached storage devices. Various modifications and departures from the disclosed example embodiments will occur to those having ordinary skill in the art. The subject matter that is intended to be within the scope of the invention is set forth in the following claims.

What is claimed is:

1. A switch comprising:
  a chassis;
  a drive bay comprising a plurality of downlink switch ports configured to removably connect a plurality of storage devices via front-access slots, wherein the drive bay is disposed on a first side of the chassis;
  a plurality of uplink switch ports disposed on a second side of the chassis that is opposite to the first side of the chassis; and
  an embedded circuit for providing signal switching between the plurality of uplink switch ports and the plurality of downlink switch ports,
  wherein the plurality of downlink switch ports is embedded in the drive bay,
  wherein the switch is rack-mountable, and
  wherein the plurality of uplink switch ports has pinouts providing an Ethernet interface, and the plurality of downlink switch ports has U.2 pinouts.

2. The switch of claim 1, wherein the plurality of downlink switch ports are embedded in the drive bay to connect the plurality of storage devices, eliminating internal connectors.

3. The switch of claim 1, wherein the plurality of uplink switch ports are small form-factor pluggable (SFP) ports.

4. The switch of claim 1, wherein the U.2 pinouts provide a peripheral component interconnect express (PCIe) interface.

5. The switch of claim 4, wherein each of the plurality of storage devices is a 2.5" small form factor (SFF) drive.

6. The switch of claim 1, wherein the plurality of storage devices are front-access drives pluggable to the drive bay.

7. The switch of claim 6, wherein the plurality of storage devices is solid-state drives (SSDs).

8. The switch of claim 7, wherein the SSDs are Ethernet-attached SSDs (eSSDs).

9. The switch of claim 8, wherein the eSSDs are connected to the switch over Ethernet.

10. The switch of claim 1, wherein each of the plurality of storage devices contains one or more non-volatile memory (NVM) targets.

11. The switch of claim 1, wherein the plurality of uplink switch ports is connected to a plurality of initiators over Ethernet.

12. The switch of claim 1, further comprising a power supply and a cooling fan.

13. The switch of claim 1, wherein the plurality of uplink switch ports is connected to a plurality of external devices compatible with non-volatile memory (NVM) express (NVMe).

14. The switch of claim 1, wherein the plurality of uplink switch ports is connected to a plurality of external devices compatible with non-volatile memory express (NVMe) over fabrics.

15. The switch of claim 1, wherein an NVMe over fabrics (NVMf)-compatible device is inserted into the drive bay.

16. The switch of claim 15, wherein the NVMf-compatible device is a micro-server or a port expander.

17. A switch comprising:
a chassis;
a drive bay comprising a plurality of downlink switch ports configured to removably connect a plurality of non-storage devices via front-access slots, wherein the drive bay is disposed on a first side of the chassis;
a plurality of uplink switch ports disposed on a second side of the chassis that is opposite to the first side of the chassis; and
an embedded circuit for providing signal switching between the plurality of uplink switch ports and the plurality of downlink switch ports,
wherein the plurality of downlink switch ports is embedded in the drive bay,
wherein the switch is rack-mountable, and
wherein the plurality of uplink switch ports has pinouts providing an Ethernet interface, and the plurality of downlink switch ports has U.2 pinouts.

18. The switch of claim 17, wherein the plurality of non-storage devices comprises one or more of: a micro-server and a port expander that are Ethernet-compatible.

19. A switch comprising:
a chassis;
a drive bay comprising a plurality of downlink switch ports configured to removably connect to a plurality of devices including at least one storage device and at least one non-storage device via front-access slots, wherein the drive bay is disposed on a first side of the chassis;
a plurality of uplink switch ports disposed on a second side of the chassis that is opposite to the first side of the chassis; and
an embedded circuit for providing signal switching between the plurality of uplink switch ports and the plurality of downlink switch ports,
wherein the plurality of downlink switch ports is embedded in the drive bay,
wherein the switch is rack-mountable and
wherein the plurality of uplink switch ports has pinouts providing an Ethernet interface, and the plurality of downlink switch ports has U.2 pinouts.

20. The switch of claim 19, wherein the at least one storage device is an Ethernet-attached solid-state drive (SSD) and the at least one non-storage device is an Ethernet-compatible micro-server or an Ethernet-compatible port expander.

* * * * *